US008328197B2

(12) United States Patent
Jones

(10) Patent No.: US 8,328,197 B2
(45) Date of Patent: Dec. 11, 2012

(54) CARD GAME

(75) Inventor: Mark H. Jones, Magalia, CA (US)

(73) Assignee: Mark H. Jones, Minden, NV (US)

( * ) Notice: Subject to any disclaimer, the term of this patent is extended or adjusted under 35 U.S.C. 154(b) by 191 days.

(21) Appl. No.: 12/699,520

(22) Filed: Feb. 3, 2010

(65) Prior Publication Data

US 2010/0201071 A1 Aug. 12, 2010

Related U.S. Application Data

(60) Provisional application No. 61/151,541, filed on Feb. 11, 2009.

(51) Int. Cl.
*A63F 1/00* (2006.01)
*A63F 13/00* (2006.01)

(52) U.S. Cl. ............. 273/292; 273/274; 463/12; 463/13

(58) Field of Classification Search .................. 273/292, 273/274, 309; 463/12, 13
See application file for complete search history.

(56) References Cited

U.S. PATENT DOCUMENTS

| | | | | |
|---|---|---|---|---|
| 5,125,667 | A * | 6/1992 | Richards | 273/303 |
| 5,265,882 | A | 11/1993 | Malek | |
| 5,328,189 | A | 7/1994 | Malek | |
| 5,395,120 | A | 3/1995 | Malek | |
| 5,407,208 | A * | 4/1995 | Keller et al. | 273/274 |
| 5,782,473 | A | 7/1998 | Chou et al. | |
| 5,839,732 | A | 11/1998 | Guidi | |
| 5,944,316 | A | 8/1999 | Hernandez | |
| 6,027,119 | A | 2/2000 | DeLisle | |
| 6,179,293 | B1 | 1/2001 | Hedman | |
| 6,270,078 | B1 | 8/2001 | Leone et al. | |
| 6,575,466 | B1 * | 6/2003 | Lizak | 273/292 |
| 6,644,666 | B1 | 11/2003 | Tamura et al. | |
| 7,238,108 | B2 | 7/2007 | Webb | |
| 7,338,362 | B1 * | 3/2008 | Gallagher | 463/13 |
| 7,575,237 | B2 | 8/2009 | Snow | |
| 7,584,968 | B2 | 9/2009 | Campbell et al. | |
| 2005/0282604 | A1 | 12/2005 | Hernandez et al. | |
| 2006/0087081 | A1 | 4/2006 | Jones | |
| 2007/0252333 | A1 | 11/2007 | Hernandez | |
| 2009/0227306 | A1 | 9/2009 | Nunnally et al. | |

* cited by examiner

*Primary Examiner* — Benjamin Layno
(74) *Attorney, Agent, or Firm* — Dickinson Wright PLLC

(57) ABSTRACT

A game of chance card game in which Players play, at least initially, against a Dealer/Bank. In one embodiment, the Dealer/Bank hand must qualify and if not Players may continue in action against one another. The object of the game is for a Player to successfully hold five cards whose total numeric value is higher than that of any of the other Players or Dealer at the end of the round. To reach a game decision, each Player must proceed through four wagering stages. The game can accommodate one to many Players and may be implemented in live table gaming or electronically implemented formats. Numeric card values are comprised of 3X, 5X and 8X, where X is a non-zero number. A Fire card (30, 30') resets the value of certain numeric cards only. Wild or Joker cards may be used which are not nullified by the Fire card.

20 Claims, 13 Drawing Sheets

CARD GAME

CROSS REFERENCE TO RELATED APPLICATIONS

This application claims priority to Provisional Patent Application No. 61/151,541 filed Feb. 11, 2009, the entire disclosure of which is hereby incorporated by reference and relied upon.

BACKGROUND OF THE INVENTION

1. Field of the Invention

This invention relates to a method for playing card games between at least one player and a dealer, and more particularly toward a multi-player card game utilizing a customized deck of playing cards and multiple wagering levels.

2. Related Art

Card games are considered by many to be educational, stimulating and exciting social activities. Many of the more popular card games are designed to mentally involve as well as test the strategic abilities of each individual player. These same characteristics are often further enhanced when the card game is combined with the opportunity for placing wagers.

A successful casino card game must hold the interest of the players in both a monetary and non-monetary manner. In today's market, the entertainment value to the customer is key to the long-term success of a game. The longer the "average time" or "time in seat" a player enjoys, the greater the chance he will return to play another day. A game with a higher House Edge that offers excitement will be accepted by most players. Roulette is an example of this. There must be something inherent in the game or its manner of play that involves a player, without regard to financial gain and/or despite the occurrence of wagers lost. The player must also entertain the perception that they have the possibility of winning the wager.

For some players or games, this inherent characteristic might be the thrill generated by the chance that luck may visit the player. Many players rely to at least some extent on the perception of luck as a driving force that motivates them to play the game. For other players, the perceived level of required skill to affect the outcome of the game is key to them participating in the action.

There are two general types of wagering used in casino card games—the Poker-style game and the House Banked-style. In Poker-style games, players play against each other whereas in a House Banked game, the players are playing individually against the house. Poker-style games tend to emphasize a competitive aspect that appeals to card players that are more confident of their skill level and less reliant on the perception of luck. During Poker-style games, the manner of wagering results in the transfer of monies among the players within the playing group. Not all card players find this type of Player vs. Player inter-play enjoyable.

In contrast, House Banked-style wagering games permit the players to compete against the bank, house or casino rather than against one another. By playing against an impersonal entity, any losses are paid out of the corporate or common fund and not the result of a fellow player's loss. As a result, multiple players can win simultaneously, thereby enhancing the playing experience for some players. In addition, most players are aware that the house manipulates the winning odds to assure a statistical advantage. House Banked-style games may also provide for a "Player-Banker." In some jurisdictions, the house is not allowed to profit from play of the game itself. It is only allowed to collect a small fee per hand. In these cases, the Player-Banker takes on the action for a given number of hands. Some jurisdictions allow for what is referred to as a "Player Pool" to act as the bank. In theory, the Player Pool belongs to the players and all wins and losses are handled by a house dealer from the pool. Player-Banker and Player-Pool games are variations of a House Banked-style wagering scheme.

When players are playing against one another in a Poker-style card game, there is no statistical advantage for the "House" and therefore it is not necessary that the game mathematics be verified. However, when the House or a Player-Banker carries a hand in the game which is used to challenge all other hands, certified math is a must to assure that the House has the required edge to take on the associated risk. There are some banked games where the player wagers on a given community hand, such as in Baccarat, that has specific rules of play that still give the House its required edge necessary to offer the game.

US Publication No. 2006/0087081 to Jones, published Apr. 27, 2006, discloses a method for playing a card game in Poker-style format. This publication describes a card game in which players receive three cards in a first round. The face values of these cards are kept secret while a Dragon card is revealed from the deck which has the effect of nullifying all similarly numerically valued cards. Players continuing in the game receive two more cards, and the player holding the highest numeric card count is declared the winner and awarded the accumulated wagers. Card values used for play in this game are Aces (ones), 2's and 3's, together with three Dragon cards which serve as wild cards. The entire disclosure of US Publication No. 2006/0087081 is incorporated here by reference and relied upon.

While the aforementioned publication describes an exciting and elegantly constructed card game, it is not well suited for play using wagering formats other than the Player vs. Player Poker-style method. Thus, players which are adverse to Poker-style play would not be interested in playing the game for extended periods of time. Furthermore, subtle yet important differences in the card values and betting structures make the Jones '081 publication unsuited for play in any structure other than Poker-style methods.

Accordingly, there is a need in the art for an improved card game which is fast and simple to play, which retains player excitement, which appeals to all types of players, which incorporates an element of luck so as to entertain a large proportion of card players, and which can be played using a House Banked-style of play, a Player-Banker style of play, a Player Pool style of play, and the like.

SUMMARY OF THE INVENTION

This invention proposes a method of playing a card game. A deck of playing cards is provided consisting essentially of a first quantity of Numbered cards each having a specified numerical face value and a second quantity of Wild cards each having an assignable numeric face value. The Numbered cards comprise an equal number of cards having face values of 3X, 5X and 8X, respectively, where X is a non-zero number. A playing surface is provided having at least one player position and one dealer position. The deck of playing cards is shuffled, and then three cards from the deck are dealt to the player and to the dealer in a manner so as to conceal the face value of the dealer's cards from the player. One card drawn from the deck is identified as a Fire card. If the Fire card is a Numbered card, then all like cards sharing the same face value are nullified for the remainder of the game. Each Wild card is assigned a face value of 3X, 5X or 8X. After requiring a player to make a second wager or fold, two more cards are dealt from the deck to player and to the dealer in a manner so as to continue concealing the face value of the dealer's cards from the player. After requiring the player to make a third wager or fold, the face values of the player's cards and the dealer's cards are revealed. The numerical sum of face card values are computed in the player's hand and the dealer's hand, with the player being declared a winner if the numerical sum of their hand is greater than the numerical sum of the dealer's hand.

According to another embodiment of this invention, a method for playing a multi-player card game is provided. As before, a deck of playing cards consists essentially of a first quantity of Numbered cards and a second quantity of Wild cards. The Numbered cards comprise an equal number of cards having face values of 3X, 5X and 8X, respectively, where X is a non-zero number. At least first and second player positions are provided at the playing surface, together with a dealer position. After randomly arranging (i.e., shuffling) all of the playing cards in the deck, three cards are dealt to each player and to the dealer in a manner so as to conceal the face values of other player's cards and the dealer's cards from each player. A Fire card is drawn from the deck, with its number nullifying all like cards sharing the same face value. Each Wild card is assigned a face value of 8X, 5X or 3X. After requiring each player to make a second wager or fold, the dealer's hand is exposed and compared to a pre-specified number. If the numerical sum of face card values in the dealer's hand is less than the pre-specified number, the dealer's hand is disqualified and game play continues in a Poker-style wagering manner. Upon this contingency, each player makes a second wager or folds, and then is dealt two additional cards from the deck so as to conceal the face value from the other players. After requiring a third wager or fold decision, the face values of each player's cards are revealed and their numerical sums computed. The player with the highest numerical sum is the winner. If, however, the numerical sum of the face card values in the dealer's hand is greater than the pre-specified number, then play continues in some form of a House Banked or Player-Banker method of play with each player playing against the dealer's hand and ultimately winning (irrespective of the other players), if the numerical sum of their hand is greater than the numerical sum of the dealer's hand.

This invention provides an interesting, fast paced and easy-to-learn card game that can be dealt in any banking scheme. Various wagering options can be introduced to hold and maintain player interest and excitement over extended periods of play.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
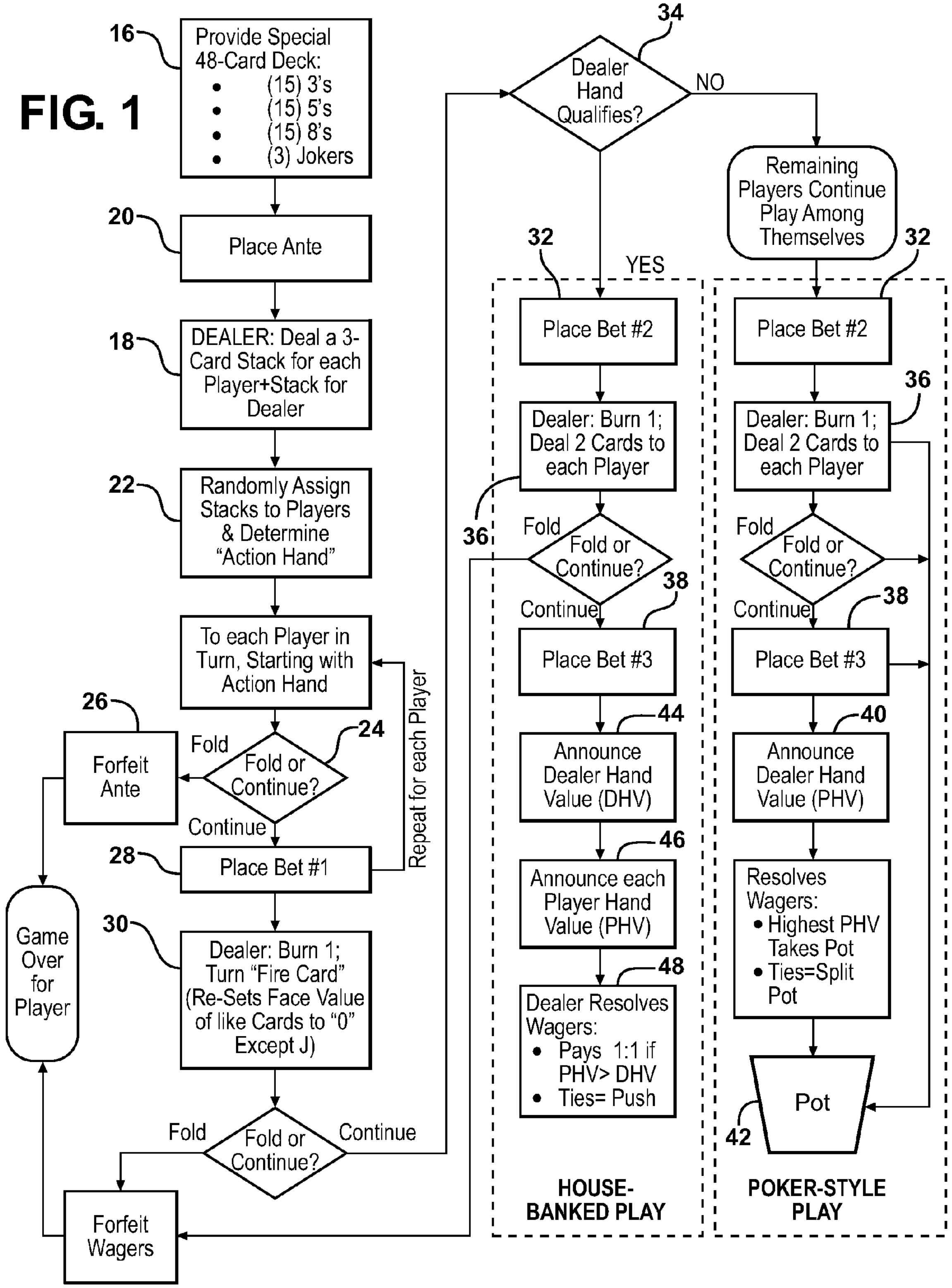
FIG. 1 is a simplified flow chart describing one method of game play according to this invention where a Dealer's hand must qualify at an intermediate stage, with play continuing in Poker-style format if the Dealer's hand does not qualify.

Referring to the figures, wherein like numerals indicate like or corresponding parts throughout the several views, a method for playing a card game according to a first embodiment of this invention is described schematically in FIG. 1. According to this first embodiment, a deck of cards is provided at step 16. The deck of playing cards consists essentially of a first quantity of Numbered cards each having a specified numerical face value. Preferably, the face values are 3, 5 and 8, however multiples of these, i.e., 3X, 5X and 8X (where X is a non-zero number), are possible without departing from the strategic nuances provided by these particular face values. The specific ratio of card values 3:5:8 have been found to yield an optimal balance of genuine strategic planning and the perception of luck component needed to attract and maintain player interest in a House Banked-style game format.

As shown in FIG. 1, the deck of cards may comprise 15-3's, 15-5's and 15-8's. The specific quantity of each card value is not as important as the fact that there are equal numbers of 3's, 5's and 8's. Indeed, in another embodiment of this invention to be described subsequently, there are provided 16-3's, 16-5's and 16-8's. Other card quantities may be used. The deck of cards also includes a quantity of Wild cards. These Wild cards have an assignable numerical face value. That is, the numerical value of the Wild cards is established at some point in the game play. As shown in function block 16, there may be 3 Jokers (i.e., Wild cards) provided which, in combination with the 45 Numbered cards, creates a special 48 card deck.

Figure 13:
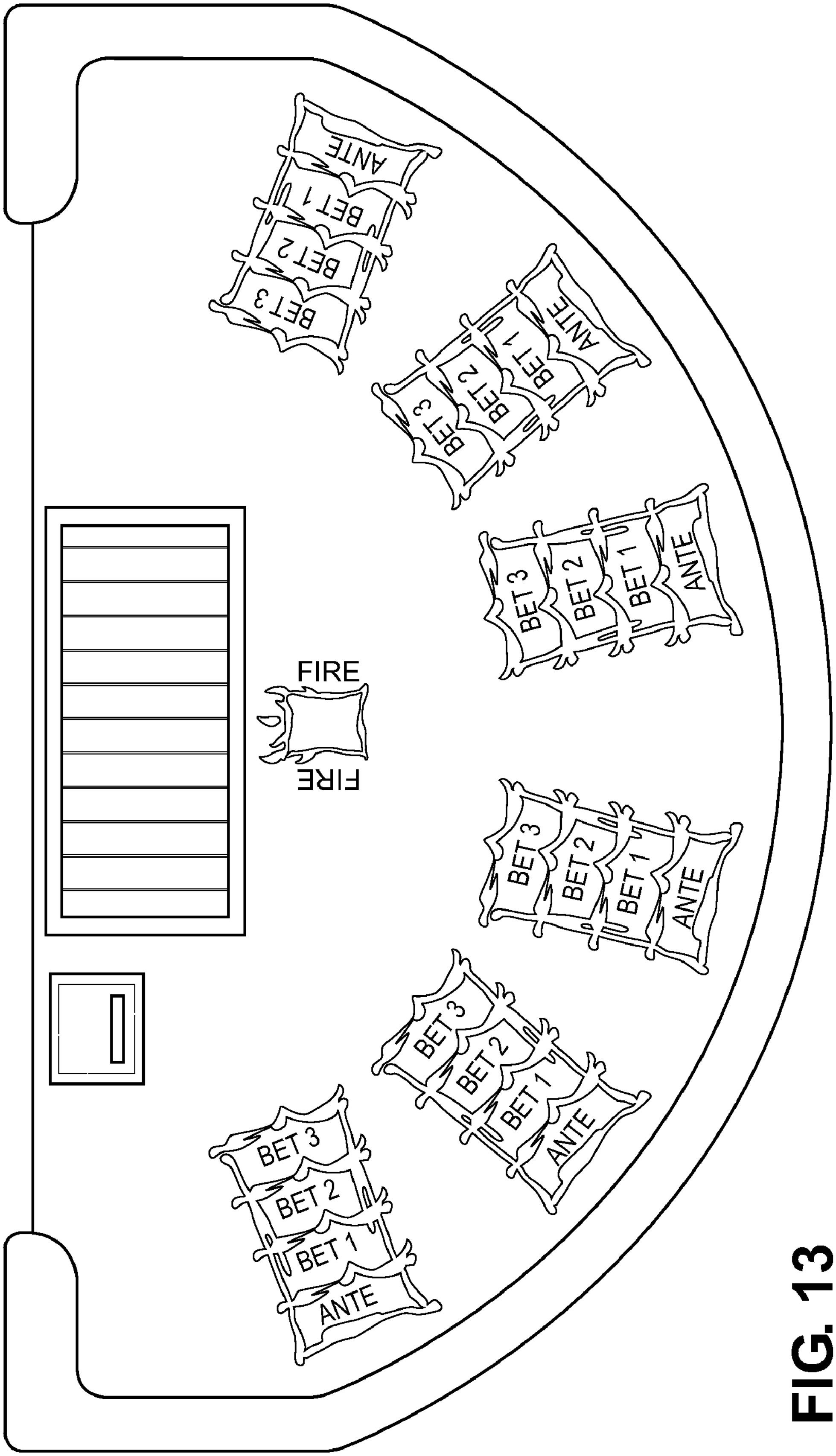
FIG. 13 is an exemplary playing surface arranged in accordance with either embodiment of this invention.

According to this first embodiment, the game is played on a playing surface having at least first and second Player positions and one Dealer position. A suitable playing surface is shown in FIG. 13 as one example. Of course, the game may also be played in an electronic gaming environment, whereby the playing surface is presented on a display screen of a computer implemented device. This may be either an electronic gaming machine like video Poker machines found in regulated gaming establishments, via a personal computer or hand held device running software from the internal memory or the Internet, or by other known methods. In an electronic or virtual environment, the deck of playing cards would be displayed as images of playing cards on the display screen, whereas in a tangible application, the deck of cards comprise physical playing cards which are handled by Players in real life.

After shuffling the deck of cards, game play begins by dealing three cards from the deck to each Player and to the Dealer as depicted in step 18. This action may be preceded by requiring each Player to post an ante, a sum of value which may be fixed by house rules or variable. Placing of the ante is described at step 20. At this stage, cards are dealt secretly to each Player, so that their face values are concealed from the other Players. Step 22 assigns one of the Players to be the "action hand." This assignment can take place in various ways deemed fair and efficient. For example, according to one technique, a single multi-sided die corresponding in number to the number of player positions. Thus, if there are 6 player positions, a standard 6-sided die will suffice. Each side of the die in this instance corresponds to a particular player position so that the resulting roll of the die will indicate which Player is to receive the first stack of three cards (assuming the cards are dealt in Pai Gow fashion). The remaining stacks of cards will then go to the Players and Banker in a clockwise order to maintain a random format for the game. Of course, other dealing arrangements may by employed so long as the cards are fairly distributed among the Players and Dealer.

As shown in step 24, each Player is queried, beginning with the action hand, whether they wish to fold or continue the game. If they fold, their ante is forfeited (step 26). If they choose to continue, they are required to place Bet #1 as per step 28. Once all of the Players have declared their intention to fold or continue, with Bet #1 being placed for each continuing Player, a Fire card is drawn from the deck. This step, as depicted at 30 in FIG. 1, may be preceded by the Dealer burning, i.e., discarding, a card from the deck. A Fire card is displayed for all the Players to see, and has the effect of resetting the face value of all like cards to zero (0) except for the Joker or Wild card. In other words, if the Fire card is a Numbered card, as opposed to a Wild card, its effect is to nullify all like cards sharing the same face value. If the Fire card is a 3, then all 3's are now worth zero points.

Wild cards may be assigned a face value of 3X, 5X or 8X. According to one method, the value of the Wild card may be assigned 8X if the Fire card is anything other than an 8X, on the basis that 8X is the highest value card. If the Fire card is an 8 then the Wild card would be assigned the next highest number 5. A Fire card drawn as a Wild card has no effect on the value of any card, and Wild cards will still be assigned a value of 8X (or 5X or 3X). According to another method for implementing this game, a Wild card may be assigned a fixed face value of 8X (or 5X or 3X) no matter what the Fire card is revealed to be. Even if the Fire card is an 8X (or 5X or 3X) the Wild card still assumes the value of 8X (or 5X or 3X). As described throughout the remainder of this specification, however, it will be presumed that the Wild card will be assigned a value of 8X unless the Fire card is an 8X, in which case the Wild card will be assigned a face value of 5X.

Turning of the Fire card substantially alters the value of playing cards among the various distributed hands. As a result, some Players may be faced with a hand that is now very low value and they may choose to fold whereupon their Bet #1 and ante are forfeited to the Dealer/House. Players deciding to continue play at this stage, however, are required to place a Bet #2 as shown in step 32 in FIG. 1. Either immediately before or immediately after the placing of Bet #2, the Dealer's cards are revealed and their numerical sum compared to a pre-specified number represented at step 34. The pre-specified number may be any appropriately determined (e.g., set by the House) number but preferably will comprise a number between zero (0) and 24X. If the Dealer's hand does not qualify, i.e., is less than the pre-specified number, the Dealer drops out of play and the remaining Players continue in Poker-style fashion. If the Dealer's hand does qualify, i.e., the numerical sum of face value cards in the Dealer's hand is greater than the pre-specified number, play continues in House Banked-style of play with the Dealer hand determining the outcome for each Player individually.

Considering the scenario where the Dealer hand does not qualify for continued play because the numerical sum of face value cards in the Dealer's hand is less than the pre-specified number, play continues in Poker-style format as shown in FIG. 1. The Dealer, continuing to serve as a Dealer but without a hand, deals two additional cards to each remaining Player, as shown in step 36. This may be preceded by the Dealer burning one or more cards from the deck. Each remaining Player now possesses a hand composed of five cards whose numerical values can be computed in relation to the face values, the drawn Fire card and the assigned value for Wild cards. Each Player must decide to continue play or fold. If they continue play, Bet #3 must be placed as shown at step 38. The face values of each Player's cards are revealed so that the numerical sum of their face values can be computed. This is represented in step 40. The Player with the highest numerical sum, i.e., the highest Player hand value (PHV), is declared the winner. The winner is awarded the pot 42 which contains the accumulated wagers from Bet #2 (step 32) and Bet #3 (step 38). Bet #1 (step 28) and the antes (step 20) are retained by the House. However, alternative rules may apply so that the winner acquires part or all of Bet #1 and the ante bets. In the event of a tie, i.e., two or more Players have the highest PHV, the pot 42 is equally divided.

Considering, however, the scenario in which the numerical sum of face card values in the Dealer's hand is greater than the pre-specified number at step 34, game play continues in some form of House Banked-style. As in Poker-style play, steps 36 through 38 are substantially similar, in that each Player (together with the Dealer) are dealt two additional cards, followed by the decision for each Player to fold or continue. Continuing Players place Bet #3. Following this, however, the Dealer hand value (DHV) is announced (step 44). Each Player is then required to announce or show their hands (step 46) so that a Player hand value (PHV) can be determined for each. If the Dealer hand value (DHV) is greater than the Player hand value (PHV), then the Dealer wins all sums placed at risk. However, if PHV is greater than DHV, the Player is declared the winner. This may result in a 1:1 return on the wagered sums. Ties, i.e., situations in which PHV=DHV, may result in a push or return of all wagered sums to the Player. These resolutions of the wagers are represented in step 48. In this House Banked-style of play, each Player's hand is compared individually to the Dealer's hand, and each Player is determined a winner or loser depending upon the relationship of their hand value to the Dealer's only and not to that of any other Player remaining in the game.

Figure 2:
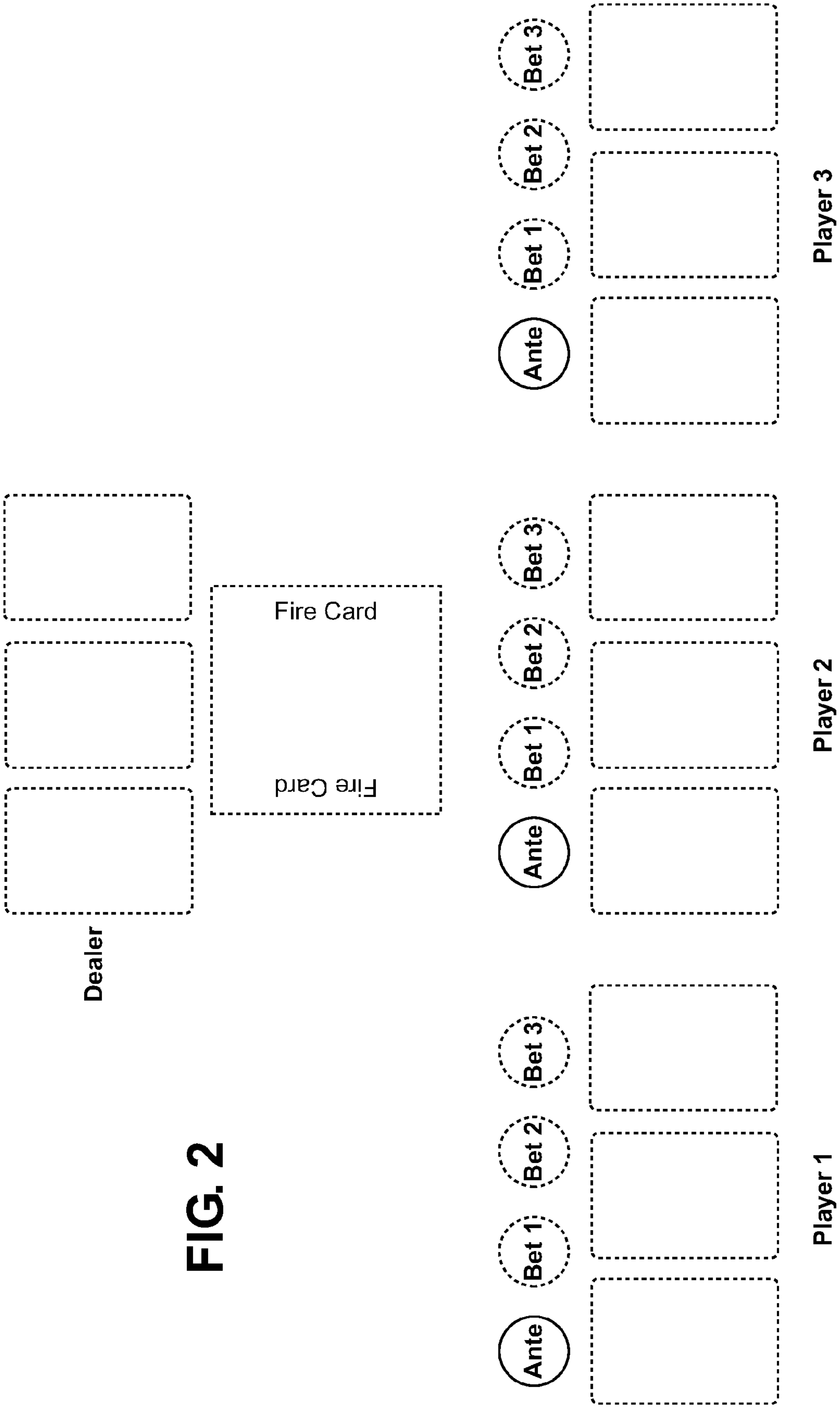
FIG. 2 is a simplified representation of a three-player game commenced according to a first embodiment of this invention.
Figure 3:
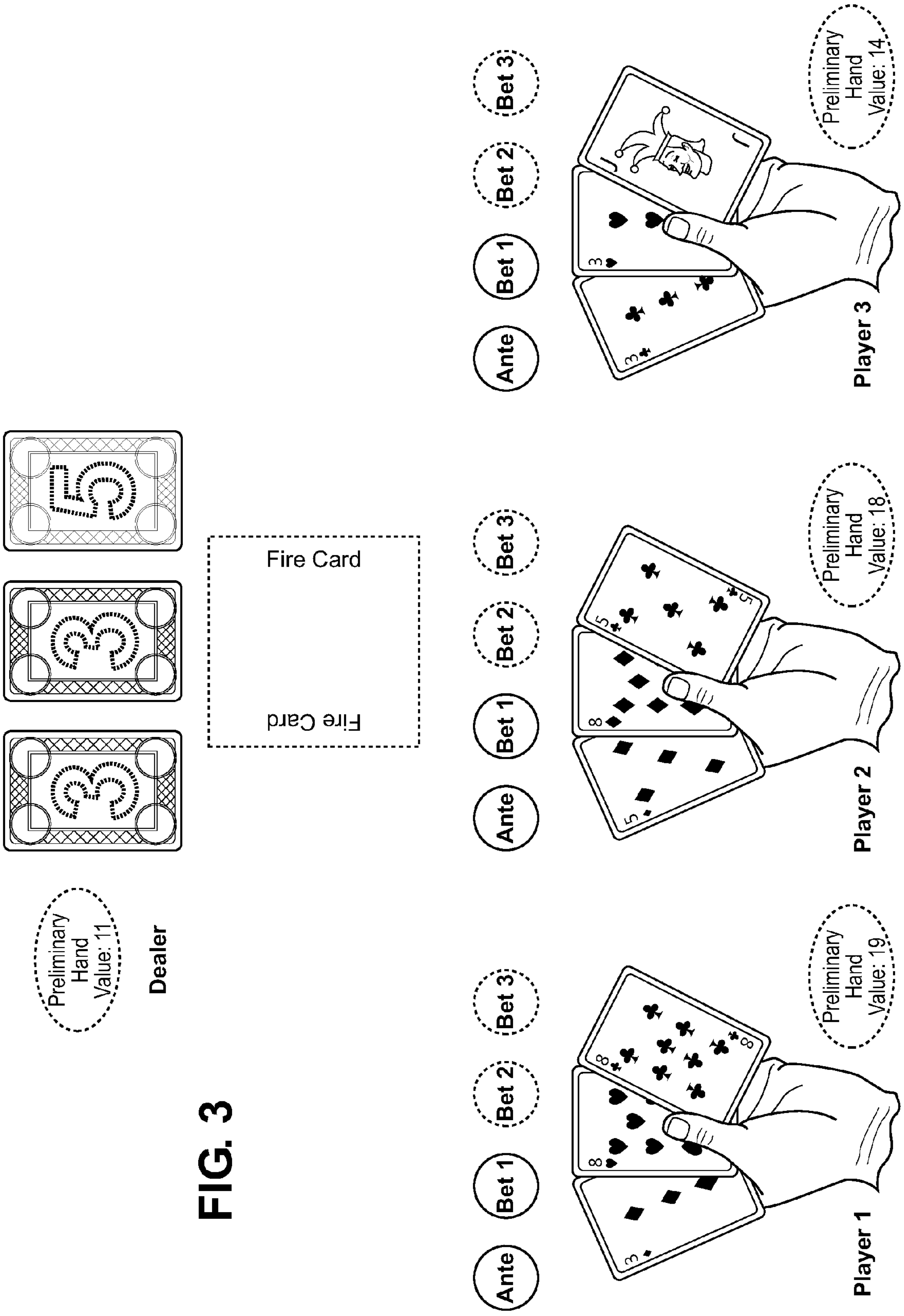
FIG. 3 is a view as in FIG. 2 showing the distribution of three cards each to a Dealer and three Players with the current numerical values of each participant's hand.

Turning now to FIGS. 2-6, an exemplary game played according to the method described in FIG. 1 is presented in highly simplified format. In FIG. 2, the playing surface is shown with positions reserved for hypothetical Players 1, 2 and 3. A Dealer position is also arranged opposite the Players. To begin play, each Player is required to post an ante (step 20). Once the ante has been placed, each Player is dealt three cards, together with the Dealer (step 18), and Bet #1 (step 28) is made for all Players deciding to continue play. This is shown in FIG. 3, where the numerical values for each card are presumed to be known only to that respective Player or Dealer and are not generally visible to the others. In this example, the Dealer's hand is comprised of 3-3-5, which has a preliminary numerical value of 11. The preliminary numerical value of the hand for Player #1 (3-8-8) is 19. The preliminary numerical value for the hand for Player #2 (5-8-5) is 18. The preliminary numerical value for the hand of Player #3 (3-3-J) is 14. The current hand value for Player 3 is computed on a preliminary assumption that the J card, which equates to a Wild or Joker card, may be temporarily assumed to be 8 pending a value assignment for the Wild card.

Figure 4:
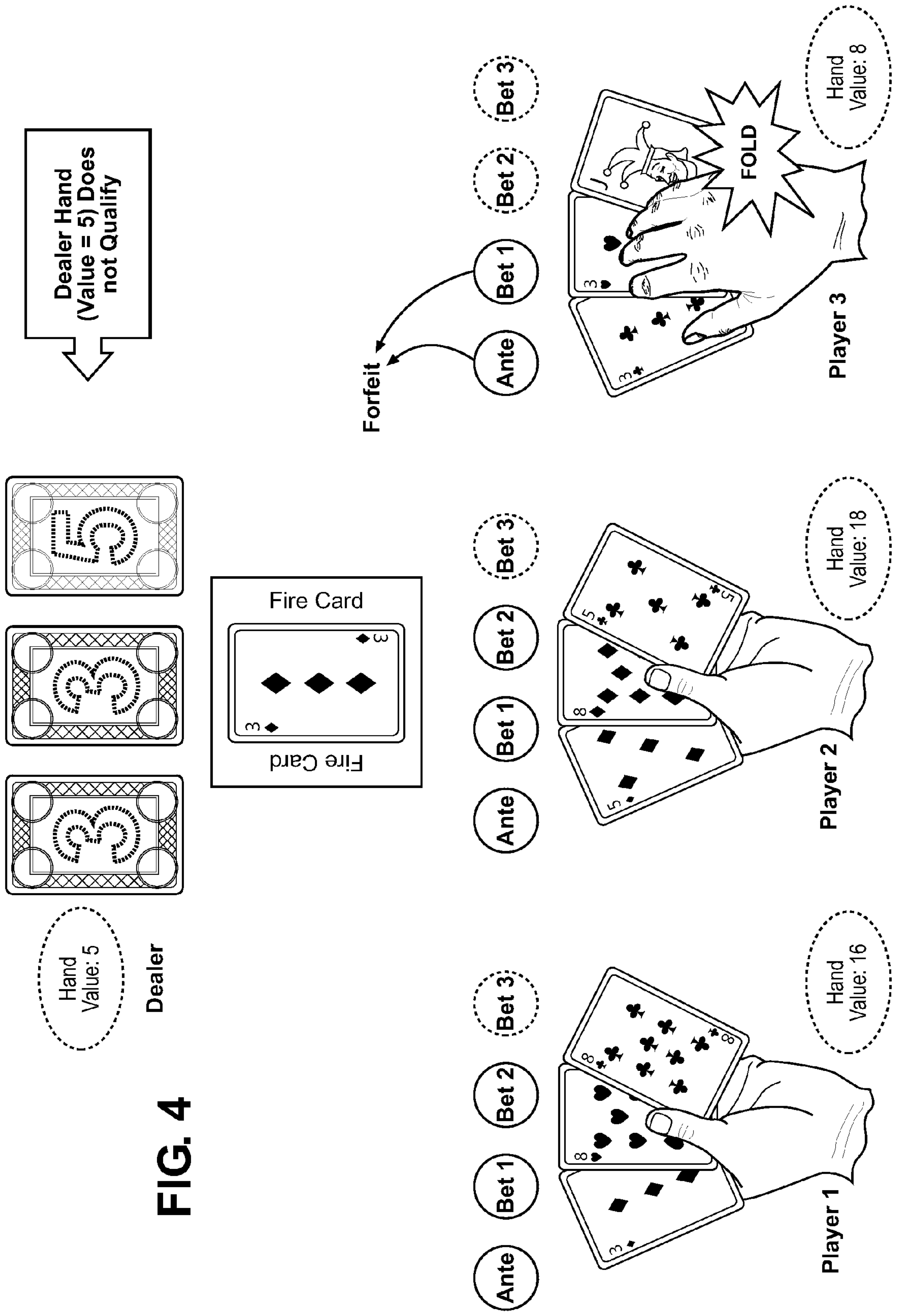
FIG. 4 is a view as in FIG. 3 following revelation of a Fire card which has the effect of nullifying all similarly-numbered cards for each player and the resulting effect on hand values.

FIG. 4 represents a further progression in game play wherein a Fire card has been turned (step 30). Here, the Fire card is shown as a 3, which has the effect of resetting the value of all "3" cards to zero for the remainder of this round of play. As a result, the value of the Dealer hand as well as Player 1 and Player 3 hands has decreased as a result of the revealed Fire card. The value of Player 2 hand has not decreased, because Player 2 did not possess any 3 cards. The value of the Wild card is now set as 8. Player 3 now has a hand value of 8, and in this example decides to fold rather than place a Bet #2 (step 32).

According to this embodiment, the Dealer hand is required to qualify in order to continue in House Banked-style of play (step 34). If the pre-specified number is six or greater, the Dealer hand will not qualify because the hand value of the Dealer is now five. Assuming the Dealer hand does not qualify, the Dealer's hand is folded and play continues in Poker-style format where Player 1 is playing directly against Player 2 for the pot 42. Players 1 and 2 both place Bet #2 (step 32).

Figure 5:
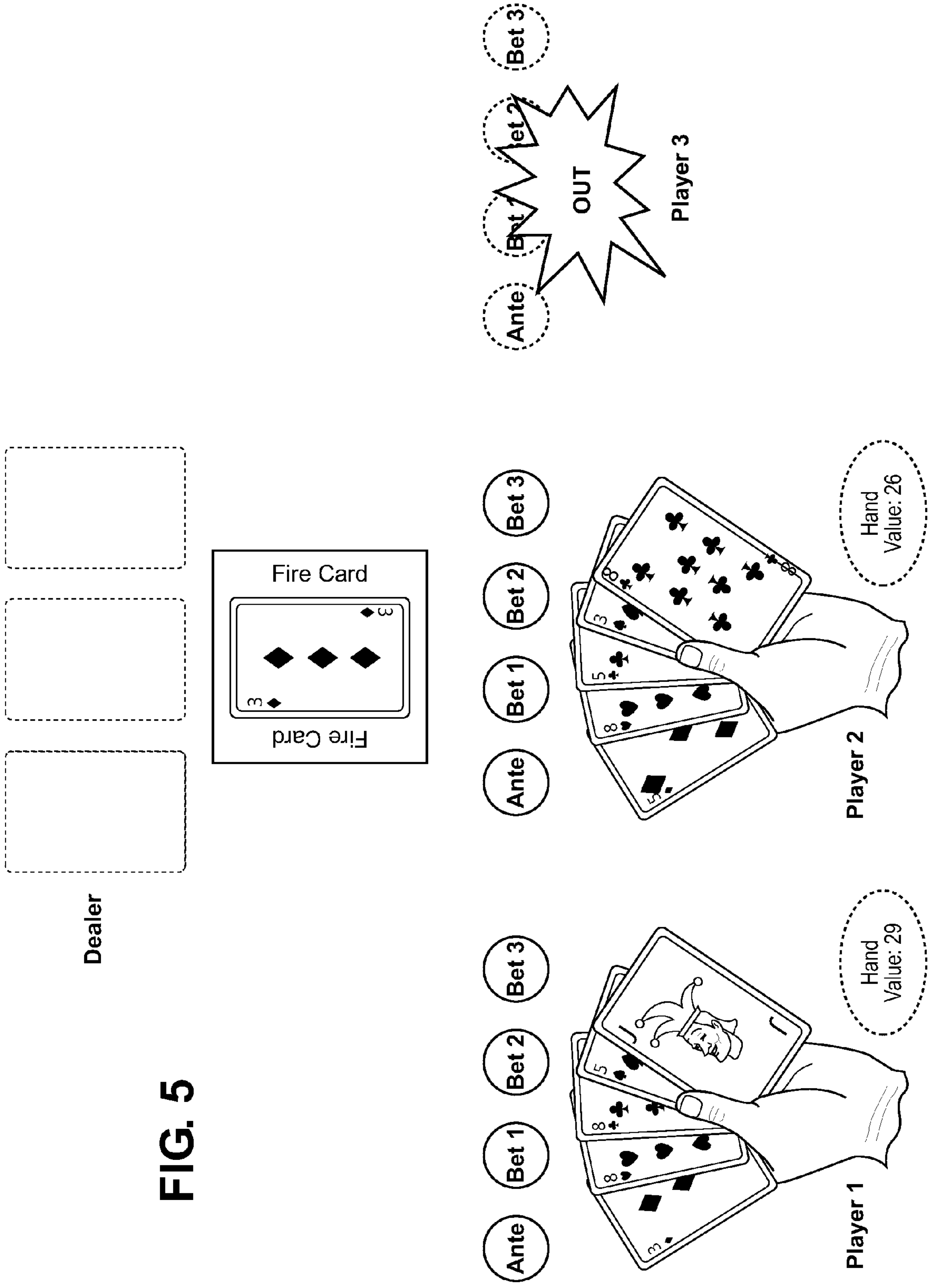
FIG. 5 is a view as in FIG. 4 describing continued play wherein the Dealer and Player 3 are no longer actively participating.
Figure 6:
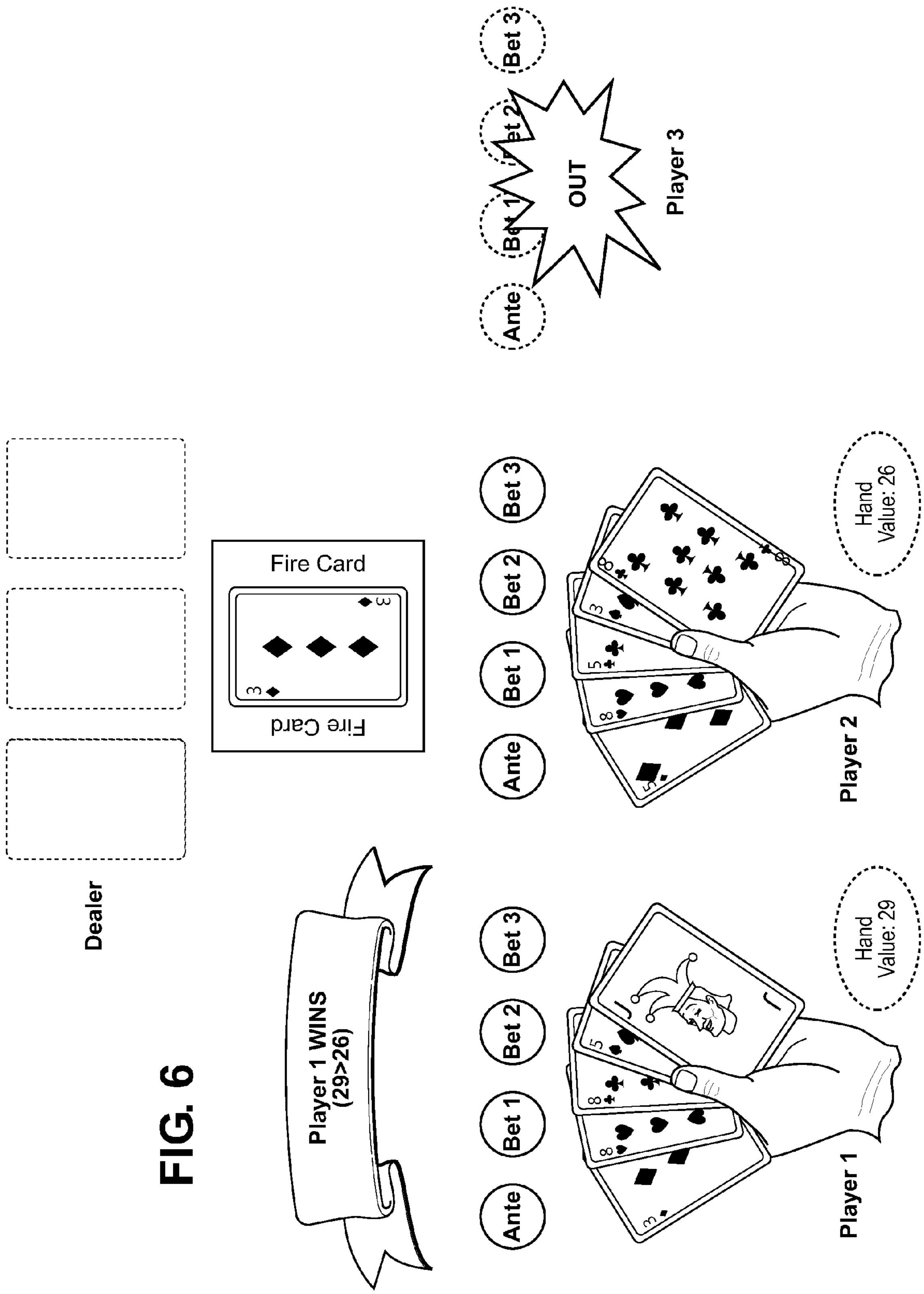
FIG. 6 is a view as in FIG. 5 but showing the revelation of player cards, with Player 1 winning on the basis of a higher numerical sum than possessed by Player 2.

FIG. 5 represents further progress in the Poker-style game wherein Player 1 and Player 2 are dealt two additional cards (step 36) and decide to continue play by placing their respective Bet #3 (step 38). The hand of Player 1 (3-8-8-5-J) has a value of 29, considering the 3 card has been nullified due to the Fire card and the Wild card (J) has been assigned a value of eight. The value for Player 2's hand (5-8-5-3-8) is 26, again considering the 3 card has been reset to a value of zero due to the Fire card. After placing Bet #3 (38), each Player's hand is revealed as shown in FIG. 6. Comparing the hand value for Player 1 against the hand value for Player 2, it is resolved that Player 1 wins. Player 1 is then awarded Bets #2 and 3 from Player 2 and has their own wagers returned (ante+Bet 1+Bet 2+Bet 3). The Dealer/House retains the ante and Bet 1 from Player 2 and Player 3.

Figure 7:
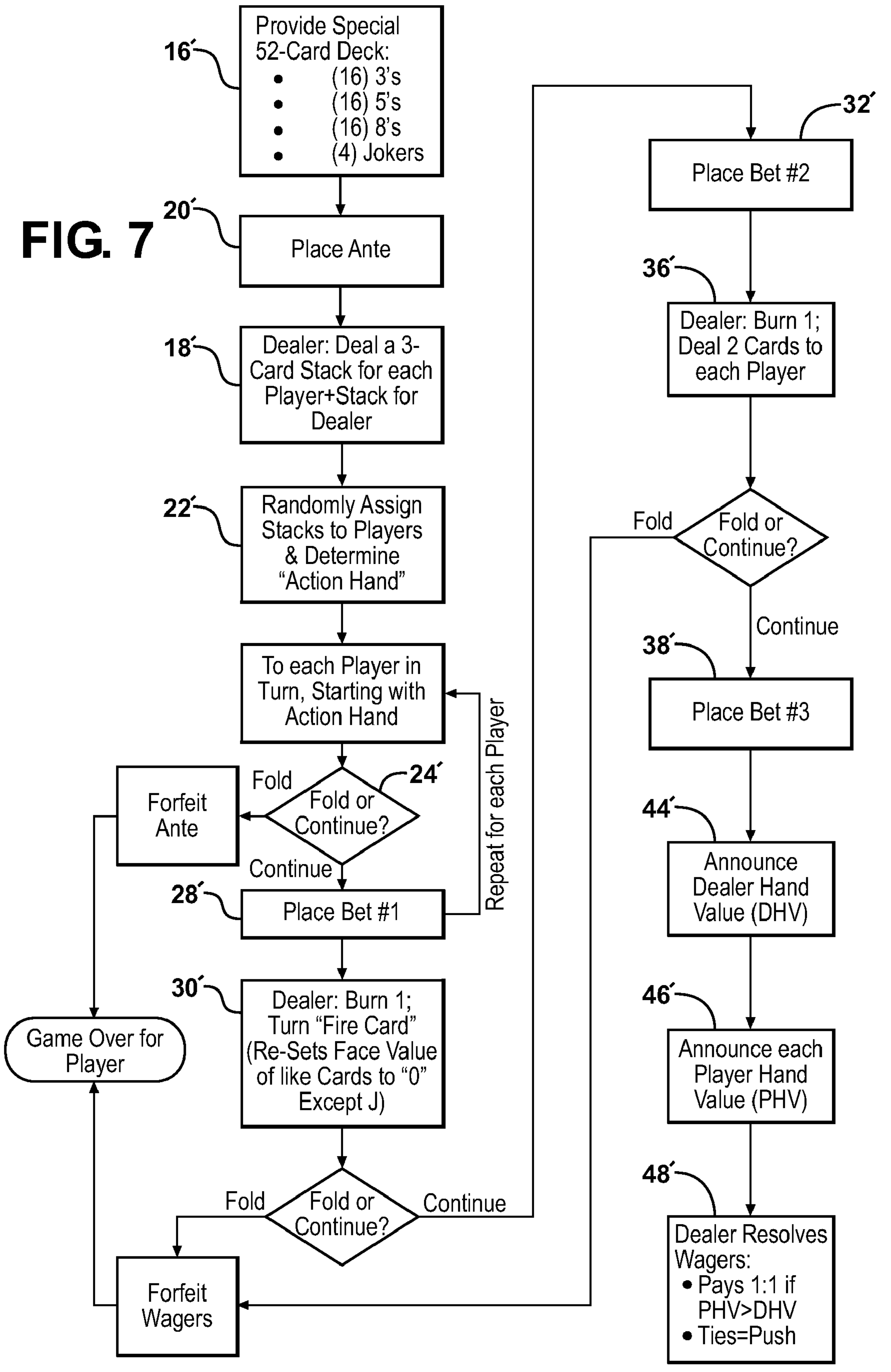
FIG. 7 is a flow chart describing an alternative second embodiment wherein each Player plays against the Dealer in House Banked format.

FIG. 7 describes an alternative method for playing the subject game, without departing from the scope or spirit of its novel properties. In this example, a special deck of 51 cards is provided at 16'. (Prime numbers here are used to describe similar or corresponding steps to those described above in connection with FIG. 1.) In this example, in which there are no Poker-style elements or methods of play, it is only necessary to have one Player and one Dealer. Accordingly, this version of the game may be readily adapted to electronic gaming environments. This is not to suggest that the first described embodiment is not adaptable to video style play, but merely that this alternative second version can be readily adapted to electronic gaming applications.

The Player places an ante (step 20') and then is dealt three cards from a deck. The Dealer is also dealt three cards (step 18'). As before, the cards are preferably dealt in Pai Gow style, where they are first arranged in stacks of three cards, and then the stacks randomly assigned to the Player(s) and Dealer in a fair manner. An action hand is determined (step 22') if there is more than one Player. Each Player in turn decides whether to continue or fold (step 24'). Continuing Players are required to place Bet #1 (step 28') following which a Fire card is turned (step 30'). Players are permitted to fold and forfeit wagers if they do not wish to continue once the Fire card has been revealed. If they do wish to continue, Bet #2 must be placed (step 32') following which each Player and Dealer are dealt two more cards (step 36'). Again, each Player is invited to fold their hand and forfeit wagers if they do not wish to continue. Continuing Players must place Bet #3 (step 38').

A Dealer hand value (DHV) may then be announced (step 44'), followed by the revelation of each Player hand value (PHV) as per step 46'. Wagers are resolved as per step 48', consistent with that described above in connection with the first embodiment of this invention.

Figure 8:
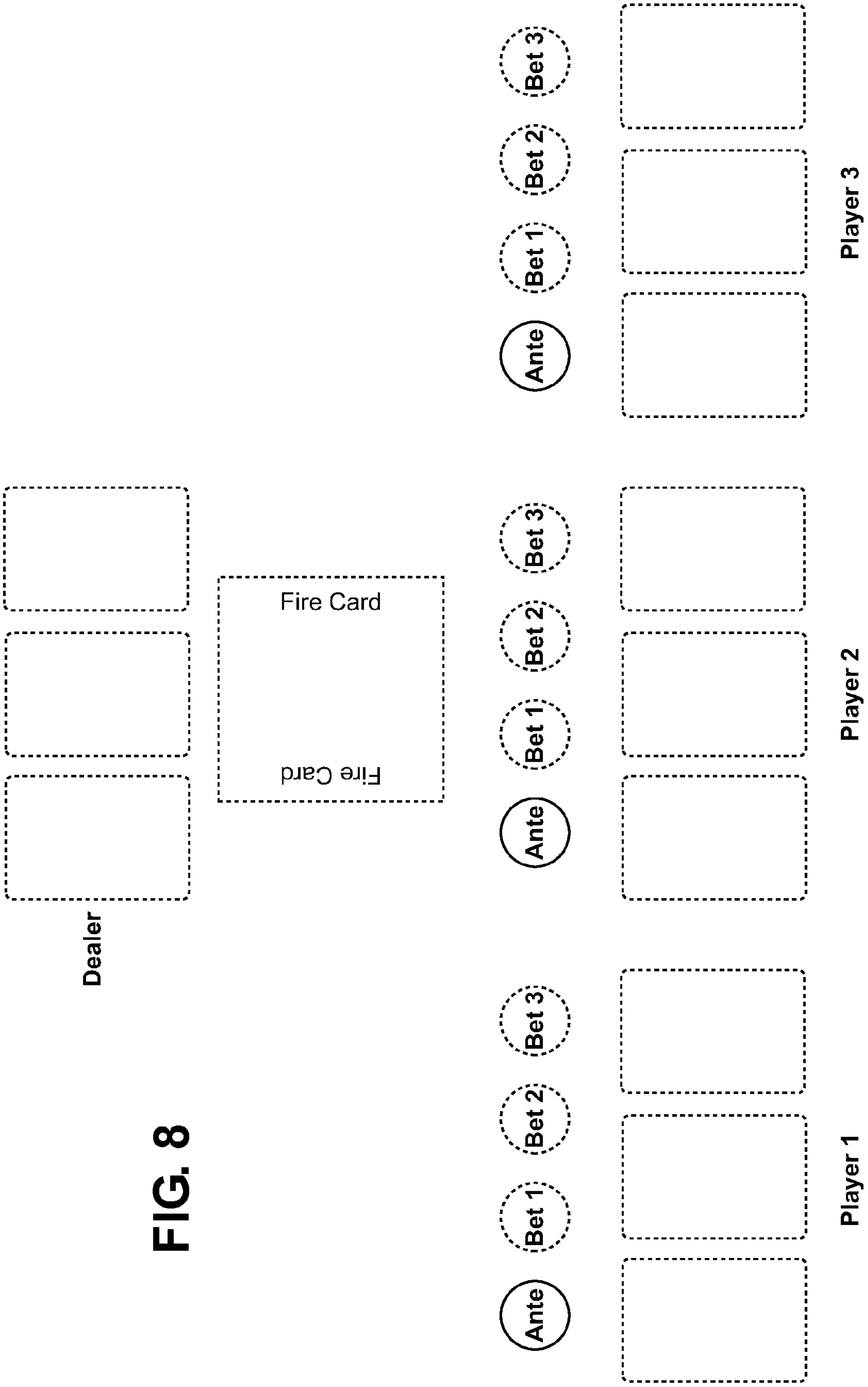
FIG. 8 is a simplified view as in FIG. 3 of the subject game played with three players according to the second embodiment of this invention.
Figure 9:
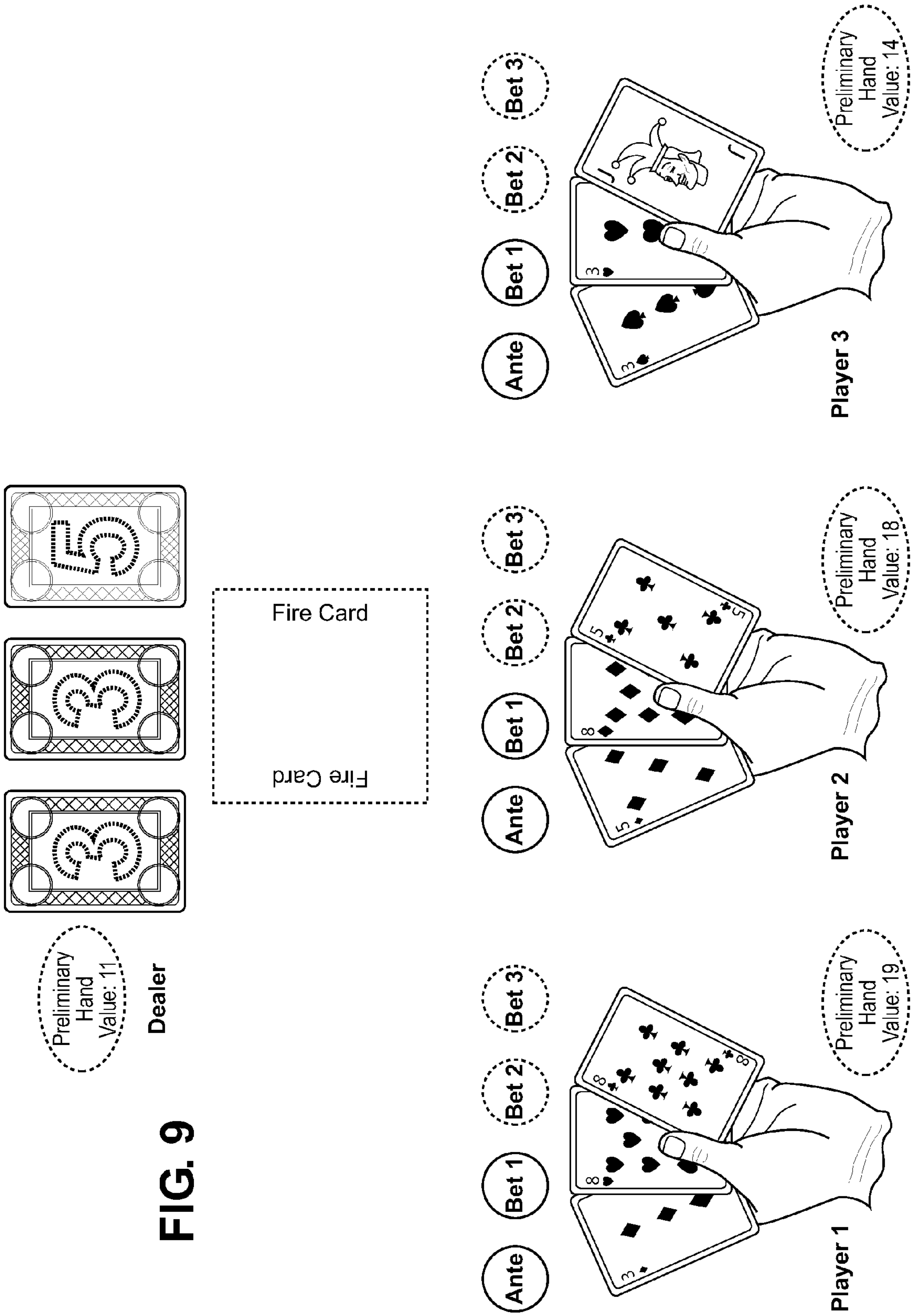
FIG. 9 is a view as in FIG. 8 showing the distribution of three cards each to a Dealer and three Players according to the second embodiment of this invention.
Figure 10:
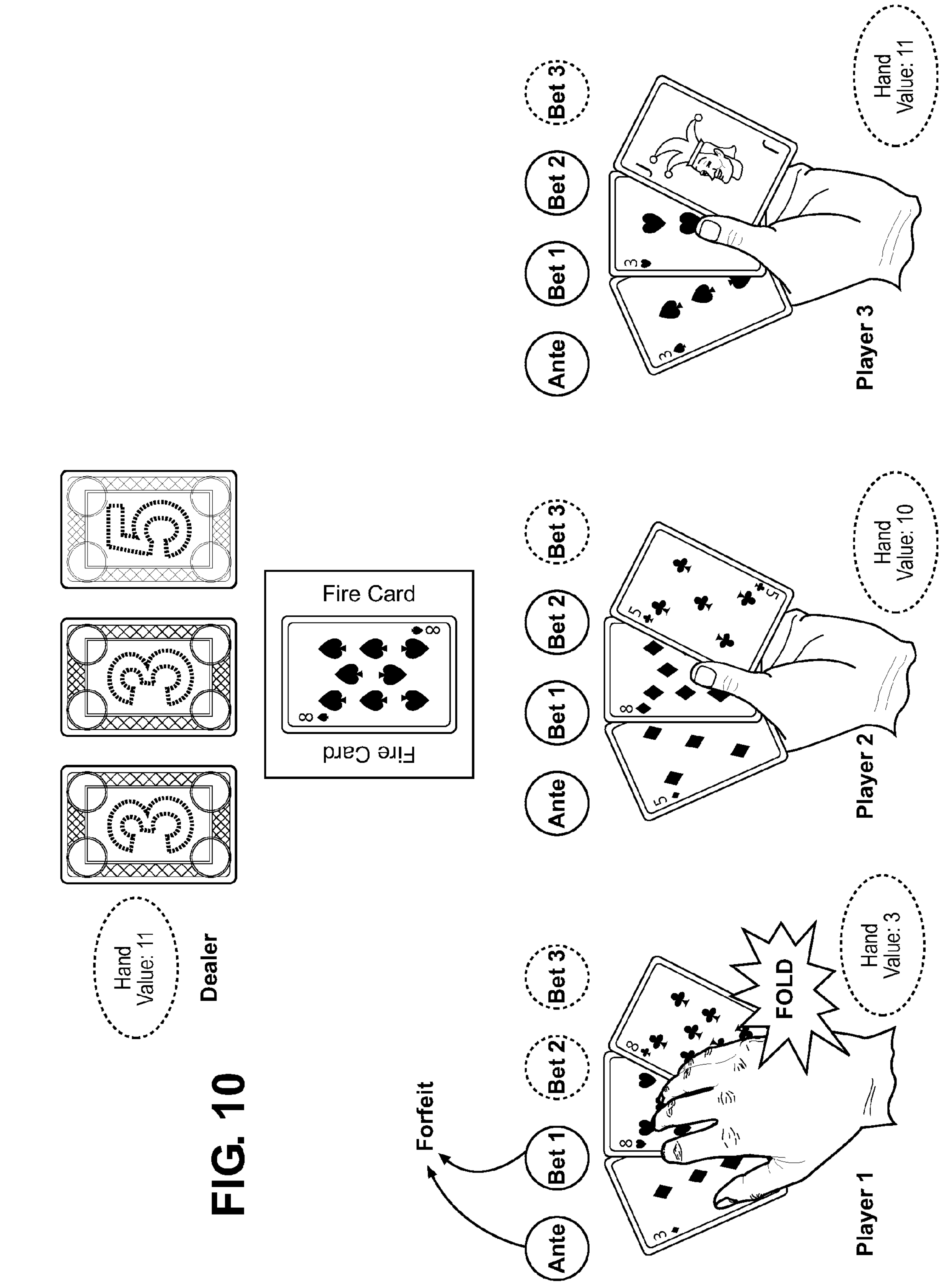
FIG. 10 is a view as in FIG. 9 showing continued play of the game wherein Player 1 has folded after revelation of the Fire card, with play continuing between the Dealer and respective Player 2 and Player 3.

FIGS. 8-12 describe one exemplary round of play according to this alternative embodiment. FIG. 8 shows a schematic playing surface with three Players (Player 1-Player 2-Player 3) each having posted an ante. Three card stacks are dealt and then assigned to each Player which, as shown in FIG. 9, result in preliminary hand values of 11 for the Dealer, 19 for Player 1, 18 for Player 2 and 14 for Player 3. All Players decide to remain in play and post Bet #1 in this example. FIG. 10 shows a further progression in the hypothetical game, with a Fire card next revealed. In this example, the Fire card is an 8, thereby nullifying or resetting the value of all 8 cards to zero. As a result, hand values for Player 1 and Player 2 are adversely affected. Player 1's hand value is affected to such a degree that Player 1 decides to fold and forfeit his ante and Bet 1. Players 2 and 3 remain in the game and post Bet 2, respectively.

Figure 11:
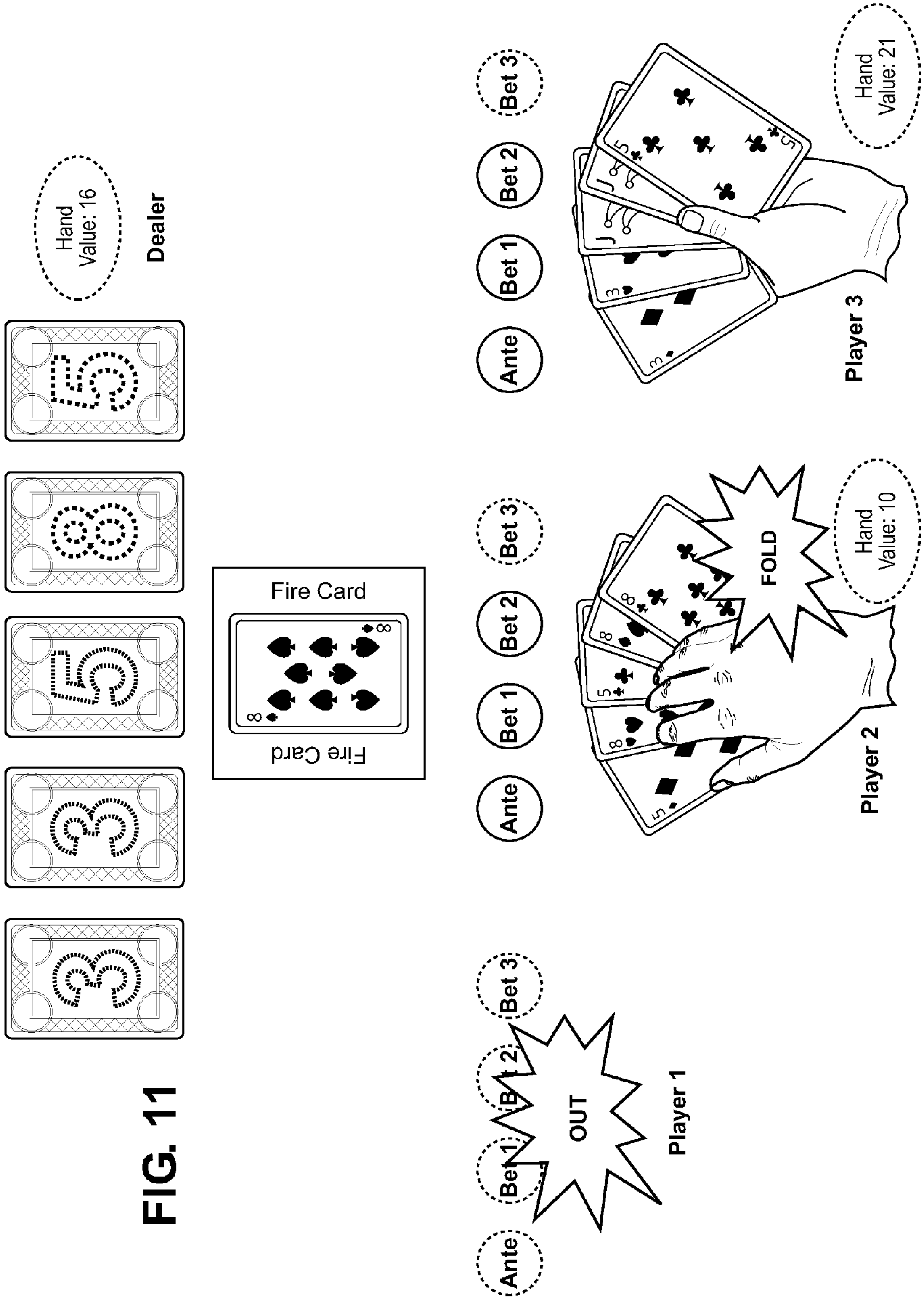
FIG. 11 is a view of continued play from that shown in FIG. 10 with the distribution of two additional cards each to the Dealer, Player 2 and Player 3.
Figure 12:
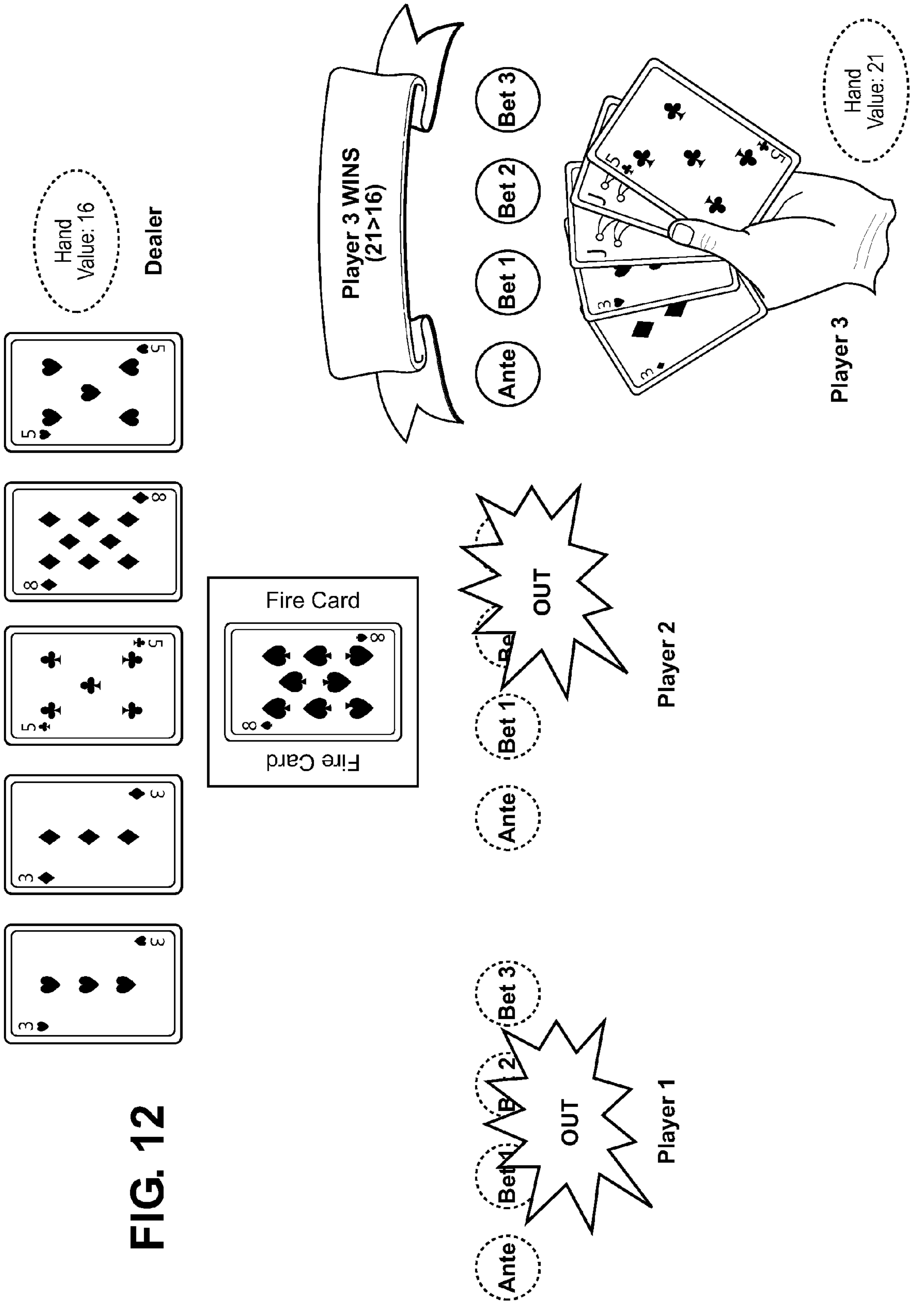
FIG. 12 is a view as in FIG. 11 showing resolution of the game played between the Dealer and Player 3, with Player 3 winning on the basis of a higher numerical sum.

At this point, all Player and Dealer cards remain concealed to others at the table. As shown in FIG. 11, the Dealer deals Player 2 and Player 3 two additional cards each, together with two additional cards to the Dealer. This results in a Dealer card hand (3-3-5-8-5) value of 16, considering the Fire card. Player 2's hand (5-8-5-8-8) now has a value of 10. This is a low number and Player 2 decides to fold, thereby forfeiting all wagered sums. Player 3's hand (3-3-J-J-5) has a value of 21, assuming the Wild/J cards have a face value of 5 in view of the Fire card. Player 3 decides to continue and places Bet 3 (step 38'). As shown in FIG. 12, Player 3 and Dealer cards are revealed and their respective sums computed. The hand value for Player 3 is 21, and greater than the Dealer hand value of 16. Therefore, Player 3 wins and may be awarded a sum in proportion to the amount wagered. This proportion may be on a 1:1 ratio or as otherwise specified according to the House rules.

According to a third alternative embodiment, this invention may be played with a 52-card deck containing sixteen 3s, sixteen 5s, sixteen 8s, and four Jokers/Wild cards as in the preceding example. In the variation, Number cards are worth face-value and Jokers are worth 5 points no matter what Fire card is drawn. As before, the goal of the game remains to score a point total greater than the Dealer's hand.

Each Player makes a 2-unit ante wager and a 1-unit Bet #1 wager at the start of play. After making both of these wagers, the Players and Dealer each get three cards. Then the Dealer reveals the Fire card. If the Fire card is a number card, all cards with that number are now worth (0) points. If the Fire card is a Joker, all cards hold their value, and Wild cards remain at the pre-set 5-point value. After the Fire card has been revealed, the Players can fold or make the 1$^{St}$ raise wager (Bet #2) of one unit (for a total of 4 units).

After the first raise (Bet #2), the Players and Dealer each receive another two cards, and the Players can now fold or make the 2$^{nd}$ raise wager (Bet #3) of one unit (for a total of 5 units). After the second raise (Bet #3), the Dealer reveals their hand and compares it to the Player. If the Player's score beats the Dealer's score, the Player wins even-money on all bets (5 units). If the Player's score is lower, the Player loses. If the Player and Dealer tie, the Player loses the 2-unit ante wager and the other three wagers are returned. Player do not add to their bank after the hand has begun; play is for table stakes only.

As an example of the intriguing strategic dimensions enabled by this game method, the following considerations may be used to a Player's advantage. After the Fire card has been dealt, make the 1$^{st}$ Raise (Bet #2) according to Table 1 which presumes that Jokers are worth 5 points, and if the Fire card is a number, all cards with that number are worth zero (0). If a Player holds the score listed or better, they decide to raise, that is place Bet #2. Conversely, if their hand value total is lower than that shown in Table 1, the Player will decide to fold.

TABLE 1

| 1$^{st}$ Raise (Bet #2) Strategy | | | | |
|---|---|---|---|---|
| Fire card | Joker | 3 | 5 | 8 |
| raise with | 13 | 8 | 5 | 5 |

After receiving their last two cards, the Player will decide whether to make the 2$^{nd}$ raise (Bet #3) or fold according to Table 2. That is, if the Player holds the score listed or better, they decide to place Bet #3. Conversely, if their hand value total is lower than that shown in Table 2, the Player will decide to fold.

TABLE 2

| 2$^{nd}$ Raise (Bet #3) Strategy | | | | |
|---|---|---|---|---|
| Fire card | Joker | 3 | 5 | 8 |
| raise with | 22 | 15 | 12 | 10 |

FIG. 13 depicts a sample layout for a table game played in accordance with the rules of this invention, and in which six Player positions are provided. Of course, other table layout arrangements and numbers of Player positions can be configured without departing from the spirit of this invention. Furthermore, the game can be readily adapted for play on a video display screen in electronically implemented applications such as in a standalone electronic game machine, a linked game machine, a standalone computer type device, or via an Internet delivered game.

Accordingly, this game provides a casino card game that can be dealt in any banking scheme. Depending upon jurisdictional laws, the game can be implemented according to many different rules while maintaining the elements and basic strategy of the game which make it enjoyable, appealing and easy to learn.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method of playing a card game, said method comprising:

executing, with a processor, a program stored in a memory of a computer implemented device, the program directing the computer implemented device to perform the following:

providing a deck of playing cards consisting essentially of a first quantity of Numbered cards each having a specified numerical face value and a second quantity of Wild cards each having an assignable numerical face value, the Numbered cards comprising an equal number of cards having face values of 3X, 5X and 8X, respectively, where X is a nonzero number;

providing a playing surface having at least one player position and one dealer position;

shuffling the deck of playing cards;

dealing three cards from the deck to the player and to the dealer in a manner so as to conceal the face value of the dealer's cards from the player;

drawing one card from the deck as a Fire card, and if the Fire card is a Numbered card then nullifying all like cards sharing the same face value;

assigning each Wild card a face value of 8X or 5X or 3X;

requiring the player to either make a Wild card wager or fold;

dealing two cards from the deck to the player and to the dealer in a manner so as to conceal the face value of the dealer's cards from the player;

requiring the player to either make an additional wager or fold;

revealing the face values of the player's cards and the dealer's cards;

computing the numerical sum of face card values in the player's hand and in the Dealer's hand; and declaring the player a winner if the numerical sum of the player's hand is greater than the numerical sum of the dealer's hand.

2. The method of claim 1, wherein said step of assigning each Wild card a face value includes assigning the Wild card a value of 5X without regard to the Fire card.

3. The method of claim 1, further including requiring the player to either make a Fire Card wager or fold prior to said step of drawing a Fire card.

4. The method of claim 1, wherein said steps of dealing three cards and dealing two cards also includes concealing the face value of the player's cards from the dealer.

5. The method of claim 1, further including the step of requiring the player to post an ante prior to said step of dealing three cards.

6. The method of claim 1, wherein said step of assigning each Wild card a face value includes assigning each Wild card a face value of 3X, 5X or 8X if the Fire card is a Wild Card.

7. The method of claim 1, wherein said step of drawing a Fire card includes first burning a card from the deck.

8. The method of claim 1, wherein said step of drawing a Fire card includes placing the Fire card face up on the playing surface.

9. The method of claim 1, wherein said step of dealing two cards includes first burning a card from deck.

10. The method of claim 1, wherein said step of providing a playing surface includes displaying the playing surface on a display screen of a computer implemented device; and said step of providing a deck of playing cards includes displaying images of playing cards on the display screen.

11. A method of playing a card game, said method comprising:

executing with a processor, a program stored in a memory of a computer implemented device, the program directing the computer implemented device to effectuate the following:

A) providing a deck of playing cards consisting essentially of a first quantity of Numbered cards each having a specified numerical face value and a second quantity of Wild cards each having an assignable numerical face value, the Numbered cards comprising an equal number of cards having face values of 3X, 5X and 8X, respectively, where X is a nonzero number;

B) providing a playing surface having at least first and second player positions and one dealer position;

C) randomly arranging all of the playing cards in the deck;

D) dealing three cards from the deck to each player and to the dealer in a manner so as to conceal the face values of other player's cards and the dealer's cards from each player;

E) drawing one card from the deck as a Fire card, and if the Fire card is a Numbered card then nullifying all like cards sharing the same face value;

F) assigning each Wild card a face value of 8X or 5X or 3X;

G) requiring each player to either make a Wild card wager or fold;

H) comparing the numerical sum of face card values in the Dealer's hand to a pre-specified number;

I) if the numerical sum of face card values in the Dealer's hand is less than the pre-specified number:

(1) disqualifying the dealer's hand;

(2) requiring each player to either make an initial wager or fold;

(3) dealing two cards from the deck to each player in a manner so as to conceal the face value of each player's cards from the other players;

(4) requiring the player to either make an additional wager or fold;

(5) revealing the face values of each player's cards;

(6) computing the numerical sum of face card values in each player's hand; and (7) declaring the player with the highest numerical sum the winner;

J) if the numerical sum of face card values in the Dealer's hand is greater than the pre-specified number, then:

(1) requiring the player to either make said initial wager or fold;

(2) dealing two cards from the deck to each player and to the dealer in a manner so as to conceal the face value of the dealer's cards and each player's cards from the other players;

(3) requiring each player to either make said additional wager or fold;

(4) revealing the face values of each player's cards and the dealer's cards;

(5) computing the numerical sum of face card values in each player's hand and in the Dealer's hand; and (6) declaring each player a winner if the numerical sum of their hand is greater than the numerical sum of the dealer's hand.

12. The method of claim 11, wherein said step of assigning each Wild card a face value includes assigning the Wild card a value of 5X without regard to the Fire card.

13. The method of claim 11, further including requiring each player to either make a Fire card wager or fold prior to said step of drawing a Fire card.

14. The method of claim 11, wherein said step of declaring the player with the highest numerical sum the winner includes awarding the winner the combined Wild card and additional wagers.

15. The method of claim 11, wherein said step of declaring the player a winner includes returning value to the player in proportion to the combined ante and wager values.

16. The method of claim 11, wherein said steps of dealing three cards and dealing two cards also includes concealing the face value of the player's cards from the dealer.

17. The method of claim 11, further including the step of requiring the player to post an ante prior to said step of dealing three cards.

18. The method of claim 11, wherein said step of assigning each Wild card a face value includes assigning each Wild card a face value of 3X, 5X or 8X if the Fire card is a Wild Card.

19. The method of claim 11, wherein said step of drawing a Fire card includes placing the Fire card face up on the playing surface.

20. The method of claim 11, wherein said step of comparing the numerical sum of face card values in the Dealer's hand to a pre-specified number includes selecting a pre-specified number between zero (0) and 24X.

* * * * *